United States Patent [19]

Fry

[11] Patent Number: 4,535,562
[45] Date of Patent: Aug. 20, 1985

[54] DEVICE FOR ATTACHING A HOOKED ITEM FOR CATCHING FISH OR THE LIKE TO A LINE WITH A KNOT THEREIN

[76] Inventor: Jewell C. Fry, Rte. 2, Box A-18, Osage Beach, Mo. 65065

[21] Appl. No.: 478,694

[22] Filed: Mar. 25, 1983

[51] Int. Cl.³ .............................................. A01K 83/00
[52] U.S. Cl. .................................. 43/44.95; 43/43.16; 43/44.83; 43/42.49; 43/44.92
[58] Field of Search ................ 43/43.16, 44.95, 42.49, 43/44.83, 42.39, 44.92, 44.98, 42.23, 42.08, 42.05, 42.36

[56] References Cited

U.S. PATENT DOCUMENTS

| | | | |
|---|---|---|---|
| 86,154 | 1/1869 | Hiltz | 43/44.83 |
| 683,750 | 10/1901 | Guindon | 43/43.16 |
| 2,138,702 | 11/1938 | Litsey | 43/44.83 |
| 2,150,074 | 3/1939 | McLure | 43/44.95 |
| 2,651,133 | 9/1953 | Sharps | 43/43.16 |
| 2,871,540 | 2/1959 | Smith | 43/44.83 |
| 2,880,547 | 4/1959 | Mills | 43/44.95 |
| 2,933,846 | 4/1960 | Garner | 43/42.49 |
| 2,938,296 | 5/1960 | Kracht | 43/43.16 |
| 3,277,549 | 10/1966 | Bradshaw | 43/42.49 |
| 3,785,011 | 1/1974 | Marks | 43/44.83 |
| 3,869,821 | 3/1975 | McGahee | 43/44.83 |
| 3,878,637 | 4/1975 | Flower | 43/44.83 |
| 3,913,185 | 10/1975 | James | 43/42.49 |
| 3,936,971 | 2/1976 | McGahee | 43/44.83 |
| 3,974,587 | 8/1976 | Levake et al. | 43/44.83 |
| 4,092,796 | 6/1978 | Adams | 43/44.83 |

FOREIGN PATENT DOCUMENTS 2756 of 1911 United Kingdom ............... 43/44.95

*Primary Examiner*—Nicholas P. Godici
*Assistant Examiner*—K. Rowan
*Attorney, Agent, or Firm*—Senniger, Powers, Leavitt and Roedel

[57] ABSTRACT

The device is generally U-shaped and has first and second side portions and an end portion joining the side portions. The device has a first section near the end portion with a width between the side portions at least as great as the diameter of the line, a second section adjacent the first section with a width between the side portions slightly less than the diameter of the line, and a third section adjacent the second section with a width between the side portions at least as great as the diameter of the line. One end of one side portion opposite the end portion is joined to the hooked item. When the hooked item is a lure, the device is joined to the lure generally at one end thereof and the other end of the device is positioned over the center of gravity of the lure and adapted for securing the line thereto so that when the lure depends from the line it will have a generally horizontal disposition.

1 Claim, 10 Drawing Figures

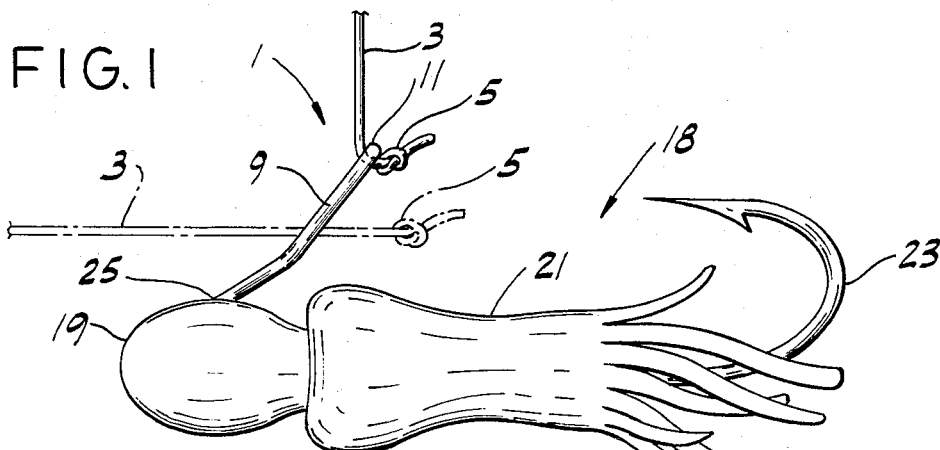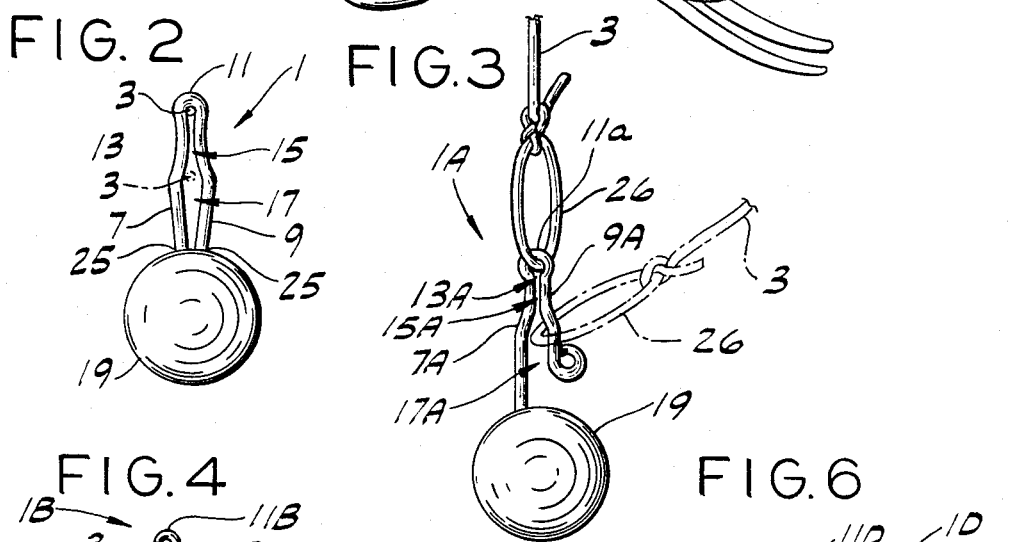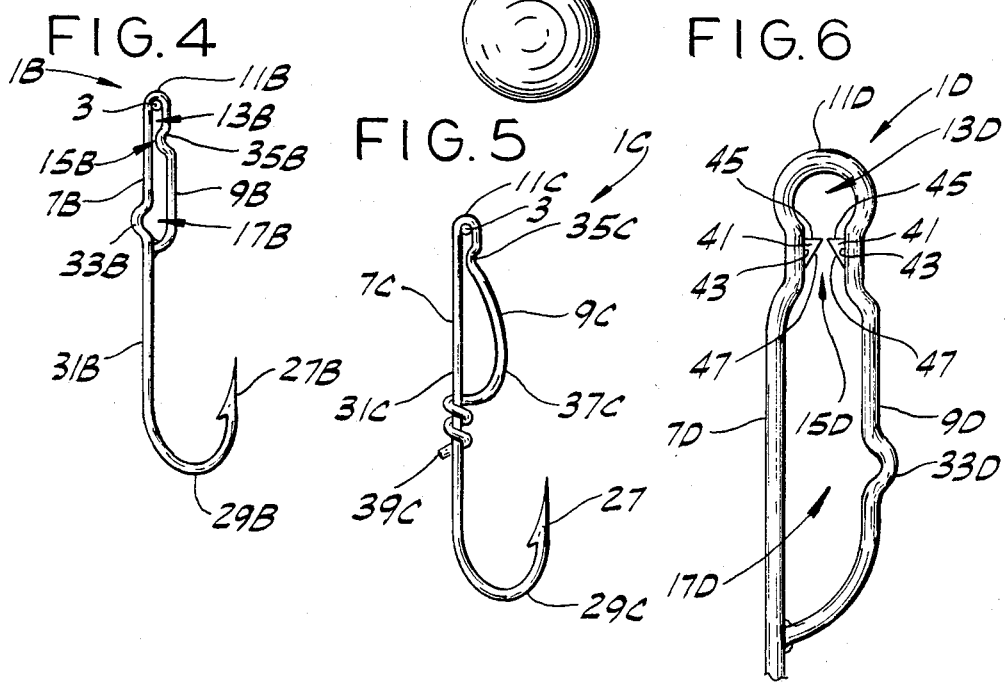

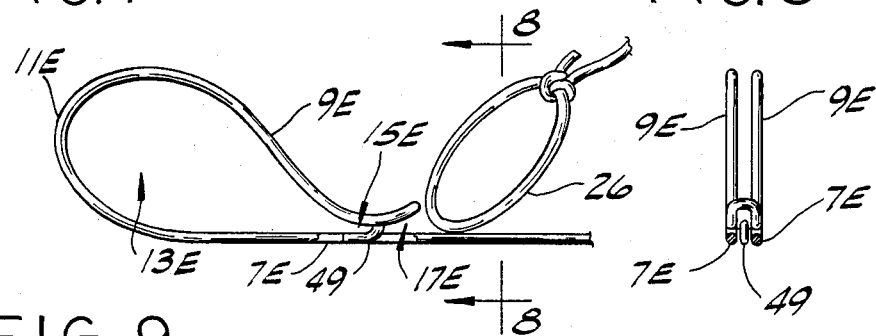
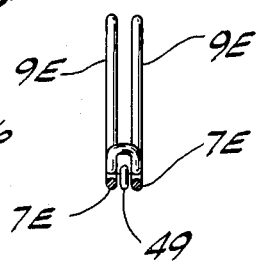
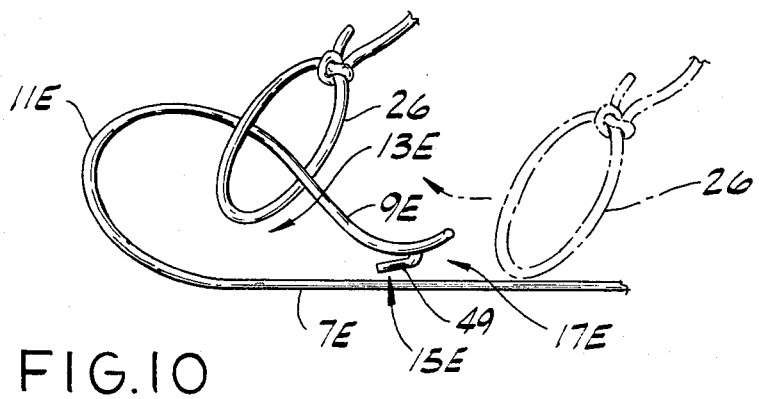
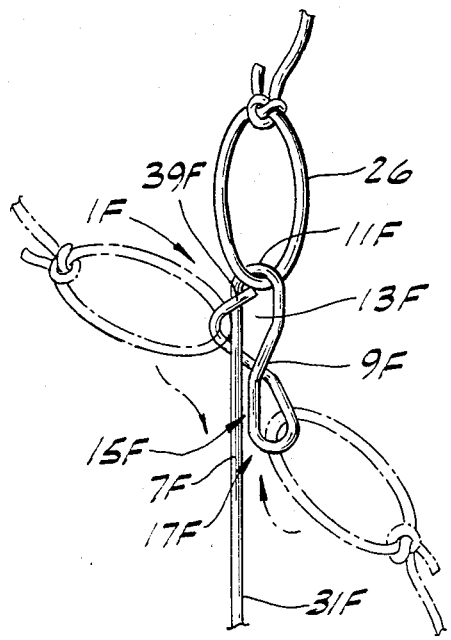

DEVICE FOR ATTACHING A HOOKED ITEM FOR CATCHING FISH OR THE LIKE TO A LINE WITH A KNOT THEREIN

BACKGROUND OF THE INVENTION

This invention relates to a device for catching fish or the like, and more particularly to a device for attaching a hooked item for catching fish or the like to a line with a knot therein or loop resulting from a knot.

Fishing has always been enjoyed by many people as both a sport and a form of relaxation. Through the centuries, numerous techniques and devices have been developed to aid fishermen in catching fish. Two of the most common devices used by fisherman today are the hook and the lure. However, these devices are not without their shortcomings for both the avid and casual fishermen. To many, the attaching of a line to a hook or lure can be difficult and frustrating since only a small eyelet is usually provided for this. It generally requires a steady hand and the same hand and eye coordination necessary to thread a needle. In addition, when fishing from a boat, pier or other type of platform, the fisherman often finds that when his lure dangles in the water directly below him, it is not disposed like the object it is supposed to be imitating.

SUMMARY OF THE INVENTION

Among the several objects of the invention may be noted the provision of an improved device for attaching a hooked item for catching fish or the like to a line whereby the line does not have to be threaded through a relatively small eyelet; the provision of such a device that allows a lure depending from a line to have a generally horizontal disposition; and the provision of such a device which is reliable and simple to use.

In general, a device of this invention is designed for attaching a hooked item for catching fish or the like to a line with a knot therein. The device is generally U-shaped and has first and second side portions and an end portion joining the side portions. The device further has a first section near the end portion with a width between the side portions at least as great as the diameter of the line, a second section adjacent the first section with a width between the side portions slightly less than the diameter of the line, and a third section adjacent the second section with a width between the side portions at least as great as the diameter of the lines. One end of the one side portion opposite the end portion is joined to the hooked item. When the hooked item is a lure, the device is joined to the lure generally at one end thereof and the other end or first section of the device is positioned over the center of gravity of the lure and adapted for securing the line thereto so that when the lure depends from the line it will have a generally horizontal disposition.

Other objects and features will be in part apparent and in part pointed out hereinafter.

BRIEF DESCRIPTION OF THE DRAWINGS

FIG. 1 is a side elevation of a device of this invention attached to a lure depending from a fishing line in solid lines and showing the fishing line through the third section of the device in phantom;

FIG. 2 is a front elevation of FIG. 1;

FIG. 3 is a front elevation of another embodiment of the device with a line having, in phantom, a loop therein through the third section of the device and in solid lines a loop therein through the first section of the device;

FIG. 4 is a front elevation of another embodiment of the device with a hook joined at one end opposite the end portion and a line through the first section of the device;

FIG. 5 is a front elevation of another embodiment of the device;

FIG. 6 is an enlarged view of another embodiment of the device with a latch at the second section;

FIG. 7 is a partial side elevation of another embodiment of the device with a latch attached to one side portion with parts broken away for clarity;

FIG. 8 is a front elevation of FIG. 7 with parts broken away for clarity;

FIG. 9 is a view similar to FIG. 7 with one side portion pulled away from the other side portion to reveal the latching mechanism; and FIG. 10 is a partial front elevation of another embodiment of the device.

Corresponding reference characters indicate corresponding parts throughout the several views of the drawings.

DESCRIPTION OF THE PREFERRED EMBODIMENTS

Referring to the drawings, a device of this invention, generally indicated at 1, for attaching a hooked item for catching fish or the like to a line 3 with a knot 5 therein is generally U-shaped (see FIG. 2) and has first and second side portions 7 and 9, respectively, and an end portion 11 joining the side portions. The device is further configured to define a first section 13 near the end portion 11 with a width between the side portions approximately as great as the diameter of the line 3, a second section 15 adjacent the first section 13 with a width between the side portions slightly less than the diameter of the line and a third section 17 adjacent the second section 15 with a width between the side portions at least as great as the diameter of the line.

The device 1 is joined to any type of hooked item for fishing. One embodiment of this invention is shown in FIGS. 1 and 2. In those Figs. the device is attached to a type of fishing lure 18, a jig, comprising a head 19, a skirt 21 and a hook 23. The ends of side portions 7 and 9 of the device opposite end portion 11 are suitably joined to the head 19 of the jig as indicated at 25 and end portion 11 is positioned over the center of gravity of the jig 18. As shown in FIGS. 1 and 2, a fishing line 3 with a knot 5 therein near its free end is inserted through the third section 17 of the device which has a width greater than the diameter of the line 3 and the knot 5 therein. It is to be understood that the width of the third section 17 could in other embodiments be greater than the diameter of the line 3 but less than the diameter of the knot 5. In this event, the knot 5 may be tied in the line 3 after inserting the line through the third section 17. The line is then pulled toward the end portion 11 whereby the line passes through the second section 15 and into the first section 13. The second section 15 has a width slightly less than the diameter of the line. Once the line 3 is within the first section 13, it will remain there since the knot 5 in the line will not pass therethrough because it has a diameter greater than the width between the side sections and because the line itself is generally larger than the width of the second section 15. Of course, the line 3 could be pulled back down through the second section 15 manually, but a careful examination of FIG. 1 reveals that it is quite unlikely that a fish could exert a force in the proper direction to do so. The width of the first section 13 in this embodiment is generally the same as the diameter of the line 3. It should be mentioned that fishing line generally has a certain amount of resiliency and that a slight contraction of a portion of the line will not cause it to become substantially weaker than the remaining portion of the line. Therefore, as long as the width of the second portion is not too small, the line will not become crimped when passed therethrough and result in that portion of the line being weaker than the rest of the line and subject to breaking at that point when placed under tension caused by a hooked fish. However, first section 13 is at least as large as the line being used so that a compressive force is not constantly applied to the line to weaken it. As shown in FIG. 1, because the end portion 11 is over the center of gravity of the jig 18, the jig dangles from line 3, when it is being used from a boat, on a pond or off the end of a dock, in a horizontal position to simulate a small water creature.

FIG. 3 shows another embodiment of the device, labelled 1A, where only one end of the side portions 7A and 9A is joined to the head 19A of the jig and the line has a loop 26 therein. The loop 26, as shown, is pulled up into the third section 17A of the device 1A and through the second section 15A and into the first section 13A similar to the embodiment shown in FIGS. 1 and 2. It is understood that a line 3 with only a knot 5 therein as shown in FIG. 1 could also be used as described above if the width between the side portions 7A and 9A of the first section 13A is generally the same as the diameter of the line so the knot would not be pulled through the first section.

FIG. 4 shows another embodiment 1B of the device used with a hook having a point 27B, a bend 29B and a shank 31B. The shank 31B is generally U-shaped forming first and second side portions 7B and 9B, respectfully, and an end portion 11B joining the side portions. The shank 31B has a bow 33B in one side portion 7B and an indention 35B in the other side portion 9B nearer to the end portion 11B than bow 33B. The distance between the bow 33B and side portion 9B defines a third section 17B generally similar to those described above and the indention 35B results in the second section 15B of the device. With this embodiment, either a pre-looped or loopless fishing line with a knot therein may be used as described above.

FIG. 5 shows another embodiment 1C of the device used with a fishing hook. This embodiment is generally similar to FIG. 4 except side portion 7C of the shank 31C is generally straight and other side portion 9C has both an indention 35C therein and a bow 37C therebelow. The free end 39C of shank 31C is twisted around side portion 7C as shown. This embodiment is only suited to be used with a line 3 having a knot therein near its free end.

FIG. 6 shows another embodiment 1D of the device with a latch having two sections or elements 41 attached to the inside of each side portion of the second section 15D of the device. Each section 41 is shown generally triangular in shape with one leg 43 attached to the side portion, another leg 45 extending perpendicular to the particular side portion toward the other section and the other leg 47 angles downwardly away from the other section. Since the shank of the hook is made of a somewhat resilient metal, as a line is pulled through the second section 15D it will separate the latch sections 41 enough to pass therethrough and will not slip back down through the second section 15D due to the flat top surface of the latch sections.

FIGS. 7-9 show a device similar to the embodiments aforementioned but is double shanked and has a latch 49 attached to both shanks of one side portion 9E near the second and third sections 15E and 17E, respectively, and extends toward the other side portion 7E between the two shanks and slightly beyond them. A looped line 6 passes from the third section 17E, through the second section 15E and into the first section 13E by forcing side portion 9E at the second 15E and third 17E sections away from the other side portion 7E, thereby retracting the latch 49 from beyond side portion 7E and permitting the looped line 6 to pass into the first section 13E.

FIG. 10 simply shows another embodiment 1F of the device for use with a loop wherein the free end 39F of the U-shaped shank 31F is twisted across both side portions 7F and 9F. The loop is placed over the free end 39F and pulled along the U-shaped shank until the loop is within the first section 13F of the device. It is understood that this device may have many more configurations and that this one is only illustrative.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for attaching a hooked item for catching fish or the like to a line with a knot therein, said line having a predetermined diameter, said device being generally U-shaped having first and second side portions and an end portion joining the side portions, said device further having a first section near the end portion with a width between the side portions at least as great as the diameter of the line, a second section adjacent said first section with a width between the side portions less than the width of the first section, a third section adjacent the second section with a width between the side portions at least as great as the diameter of the line, and the end of one side portion opposite the end portion being joined to the hooked item, a latch disposed between the side portions of the second section, said latch comprising two latch elements, one latch element being attached to the inside of one side portion of the second section and the other latch element being attached to the inside of the other side portion of the second section, said latch elements being adapted for permitting the line to be pulled from the third section through the second section to the first section and preventing the line from slipping back from the first section through the second section to the third section.

* * * * *